United States Patent [19]

Proepper et al.

[11] Patent Number: 4,941,562
[45] Date of Patent: Jul. 17, 1990

[54] ARRANGEMENT FOR TRANSPORTING ARTICLES, IN PARTICULAR PACKAGES OF RECTANGULAR BOX-SHAPE

[75] Inventors: Wilhelm Proepper; Harald Juenkersfeld, both of Wuppertal; Georg Fischer, Velbert, all of Fed. Rep. of Germany

[73] Assignee: Benz & Hilgers GmbH, Duesseldorf, Fed. Rep. of Germany

[21] Appl. No.: 190,737

[22] Filed: May 5, 1988

[30] Foreign Application Priority Data

May 9, 1987 [DE] Fed. Rep. of Germany ....... 3715570

[51] Int. Cl.$^5$ .............................................. B65G 47/24
[52] U.S. Cl. .................................... 198/416; 198/411; 198/728
[58] Field of Search ................ 198/375, 377, 402–404, 198/411–413, 416, 723, 725, 727, 728, 729, 735

[56] References Cited

U.S. PATENT DOCUMENTS

| | | | |
|---|---|---|---|
| 907,116 | 12/1908 | Baker | 198/416 X |
| 2,534,221 | 12/1950 | Borkmann | 198/402 |
| 2,805,753 | 9/1957 | Palmer | 198/416 X |
| 3,410,198 | 11/1968 | Lohr et al. | 198/402 X |
| 3,834,516 | 9/1974 | Reeser | 198/416 |
| 4,499,990 | 2/1985 | Fishback | 198/411 |

FOREIGN PATENT DOCUMENTS 1910828 3/1969 Fed. Rep. of Germany .
2506496 2/1975 Fed. Rep. of Germany .

Primary Examiner—Robert J. Spar
Assistant Examiner—Lyle Kimms
Attorney, Agent, or Firm—Klein & Vibber

[57] ABSTRACT

The invention comprises an arrangement for transporting articles, in particular rectangular box-like packages into a single or plural paths packaging machine by at least one slider and a guiding flank. The arrangement includes a combined turning and collecting arrangement for the articles, respectively packages. The guiding flanks of this arrangement define the curved guiding paths which includes curved flanks which extend essentially angularly with respect to the transport direction and further include guide grooves which coact with the slider. By this arrangement, the articles, respectively packages are slidingly fed, turned and collected.

12 Claims, 9 Drawing Sheets

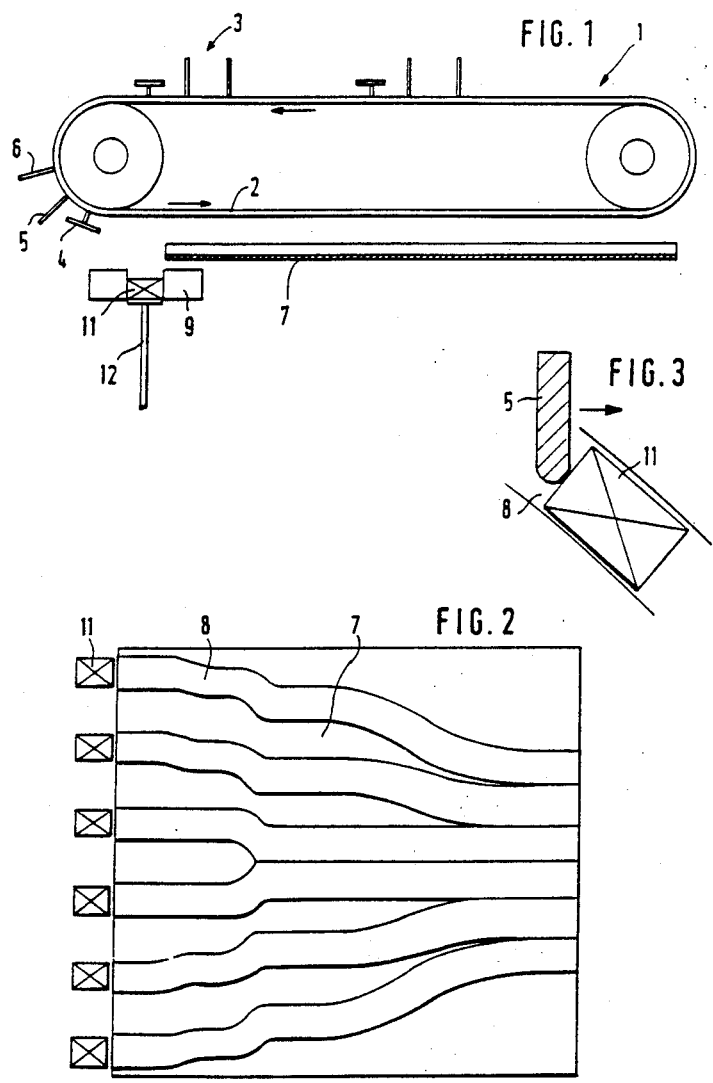

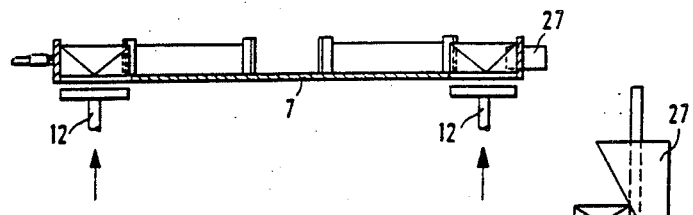
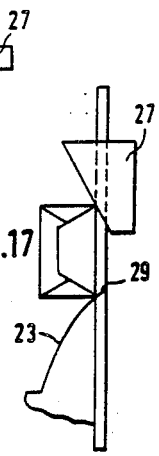
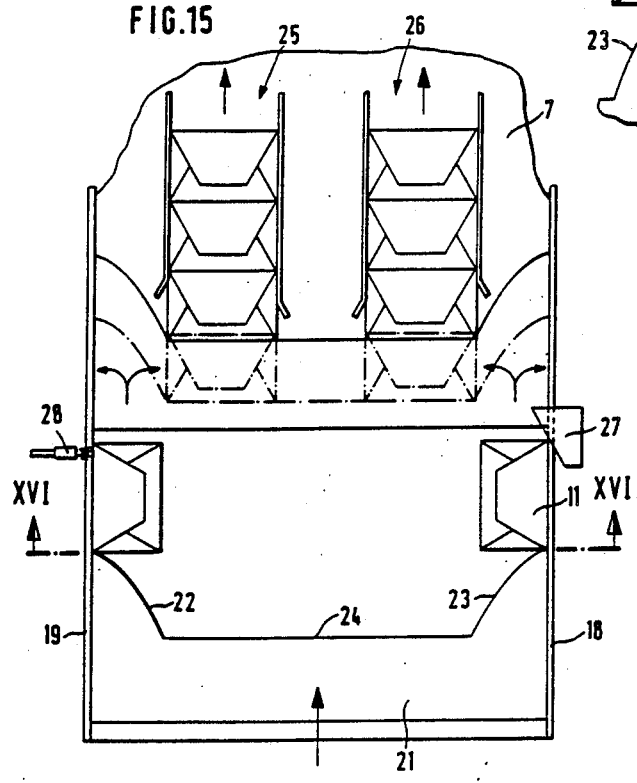

ARRANGEMENT FOR TRANSPORTING ARTICLES, IN PARTICULAR PACKAGES OF RECTANGULAR BOX-SHAPE

BACKGROUND OF THE INVENTION

An arrangement for transporting articles, in particular packages of rectangular box-like shape, towards a packaging machine. Such an arrangement may have a single or plural paths and at least one slider and one curved guide.

It is frequently the case in the packaging industry to transport articles, e.g. packages, from the packaging machine proper to a post treatment machine which is disposed downstream therefrom, e.g. a package collecting machine. In such an arrangement it is possible that the articles, respectively packages, are guided, without being rotated or they also can be rotated, e.g., about an angle of about 90°, towards the collecting machine. Frequently, the packages must not only be slidably transported and rotated, but also must be collected in a predetermined juxtaposed array.

An arrangement for continuous production of a packaging line from rows of packages is described in the German published Patent Application No. 2506496. In this known arrangement, a group of a plurality of sliders extends over the entire width of a to be released package row. This group of sliders produces a packaging line from the packaging row by means of a single feed motion of the slider group. For this purpose, the outer packages of the row are slid inwardly in the transport feed direction by means of inwardly bent sliders, which collect the packages with an inwardly bent fixed flank. The outer packages of the package row are inwardly slid into a packaging Line. By means of such an arrangement, the packages can either turn or cannot be turned.

An arrangement for transporting of articles towards a packaging machine, by means of which the articles are transported without being turned as well as also being transported and turned towards a transport band onto which they are delivered, is known from the German published Patent Application No. 1910828. By such an arrangement there can however only be delivered individual packages, e.g., from a table onto a transport band. A collecting of a plurality of packages in a particular order is not possible with such an arrangement. In such an arrangement there are always required additional mechanical motions for the sliding, turning, and collecting of the packages, respectively arrangements, which make the packaging machine not only complex but also subject to frequent malfunctioning. In addition thereto, it must be taken into consideration that for the aforedescribed motions only a relatively short time is available, so that the articles respectively packages, are highly loaded.

SUMMARY OF THE INVENTION

It is an object of this invention to provide an arrangement for transporting of articles, in particular packages of rectangular box-like shape, towards a single or plural paths packaging machine by providing an arrangement of the aforedescribed type, by means of which the articles, respectively packages, are simultaneously slidably transported, turned and collected and, thereby, are gently transported.

The object of this invention is solved in that the slider or sliders and/or the curved guide is formed as a combined turning and inward guiding arrangement for the articles, respectively packages. The novel and advantageous means of this invention provide an arrangement which makes the sliding, turning and collecting of the articles, respectively packages, possible by means of a single motion. Thereby there is achieved a relatively reduced mechanical input whereby simultaneously the malfunction frequency of such a packaging machine is considerably reduced.

In an advantageous embodiment of the invention there is provided that one or a plurality of sliders are activated by means of a driven transport member and that the curved guiding is formed by one or a plurality of guide-paths each one of which is provided with at least one curved flank.

The sliding, turning, and collecting of the packages is thereby achieved in a particularly simple and optimum manner, e.g., when in addition or in lieu of the inner situated guide-path the outer guide-path extends angularly with respect to the transport direction of the transport means, e.g., an endless toothed belt drive, an endless chain or the like, onto which a slider or a group of sliders are respectively mounted. Thereby there can be formed the sliders of each group by entrainer segments for each guide-path, and the other sliders of each group extend across all guide-paths in the form of an entrainer strip. Thereby an arrangement is obtained in which these entrainer segments transport the packages first of all in the inlet region in front of the curved flank of the guide-path up to the region of the curved flank which is disposed in advance of the transport direction of the transport arrangement, and after turning of the packages these packages are released from the entrainer segments which move further along this path and are then further transported by the common entrainer strip into the outlet region of the guide-path disposed behind the curved flank, so that, at the end of the guide-path, all packages are disposed in a common plane which is normal to the transport direction of the transport arrangement, from which the packages can be slid onto another transport system.

It is advantageous for a gentle handling and transporting of the packages to round off the entrainer segments at their free edges which are the surfaces which are the last ones to contact the packages during their feed movement. Thereby an indentation of the packages, as a result of a contact by a sharp edge of the entrainer, is avoided, so that damage to the package and deformation of the product, with which the package has been filled, e.g., butter or margarine or the like, is reduced or eliminated.

In an advantageous construction of the invention the guide-paths are formed by curved grooves disposed in a sheet metal slider. The width of each groove, with respect to the transport direction in the inlet region of its curved flanks, is slightly larger than the width of the articles, respectively packages, passing therethrough, and in an outlet region of each groove disposed downstream from the curved flanks, the width is slightly larger than the length of the articles, respectively packages, passing therethrough. By means of such an arrangement, a flawfree guidance in front of the curved flank in a rotated condition as well as also in a non-rotated condition downstream from the curved flank is achieved. TherebY the turning can be effected in the opposite direction with respect to the middle guide path, or also in the same direction, whereby it is only necessary to provide the corresponding curved grooves, e.g., the curved flank of each curved groove is provided at one side with a pointed projection and at the opposite side with a corresponding recess. It is possible to arrange the curved flank on a slider in the form of a push-slide member. Such a push-slide member has, e.g., relative to the feed direction, a holding surface which extends normal to such direction and a pair of adjoining convexlY curved flanks bilaterally arranged thereto adjoining convexly curved deflection flanks. The slider is slidably arranged on a feed table between side walls securely mounted thereon, and preferably the free ends of the guide flanks do slightly outwardly project past the side walls of the feed table, so that a package disposed in front of it can, by means of rolling, be rotated via the side flanks by an angle of 90°. Such a rotation is still further supported when a mechanical or contactless operating rotating arrangement is arranged in the region of the side walls, as, e.g., a curved flank or an air jet stream or the like which extends or blows into the path of movement of the push-slide member.

BRIEF DESCRIPTION OF THE DRAWINGS

With these and other objects in view, which will become apparent in the following detailed description, the present invention will be clearly understood, in connection with the accompanying drawings, in which:

FIG. 1 is a schematic side elevational view of a transport arrangement in accordance with this invention;

FIG. 2 is a plan view illustrating the guide-path of the transport arrangement of FIG. 1;

FIG. 3 is a partial sectional view of a portion of the transport arrangement illustrated on a larger scale;

FIG. 15 illustrates in plan view a modified construction of the transport arrangement;

FIG. 16 illustrates in side elevational view the modified construction of the transport arrangement of FIG. 15;

FIG. 17 is a partial sectional view of a further modified embodiment of the turning arrangement of the invention;

DETAILED DESCRIPTION

Figure 4:
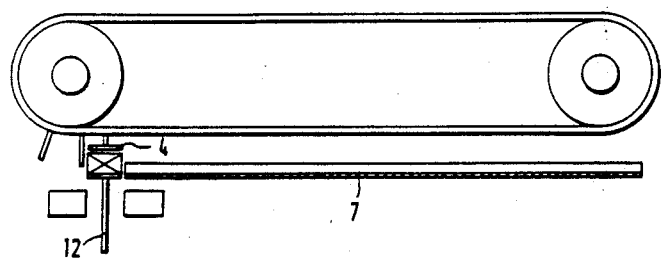
FIGS. 4 and 5 ILLUSTRATE respectively in side elevation and plan view the starting position of the transport arrangement of FIGS. 1 and 2 during its feed movement.
Figure 5:
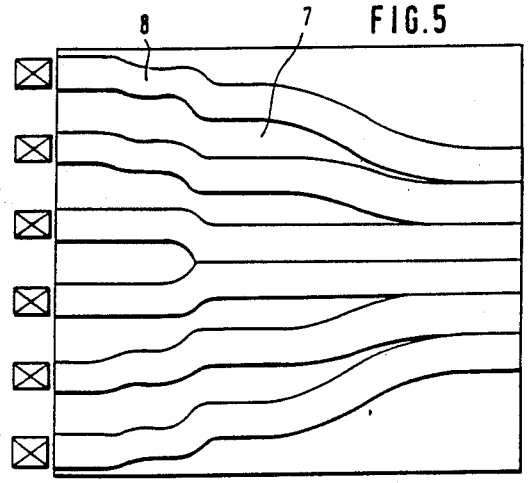
Figure 6:
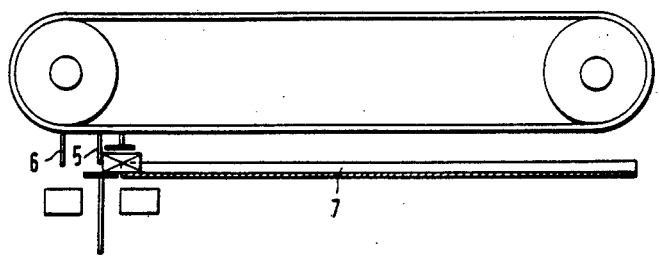
FIGS. 6 and 7 illustrate again, respectively in side elevation and plan view, the start of the feed movement of the arrangement, also showing the entrainer segments and entrainer strip.
Figure 7:
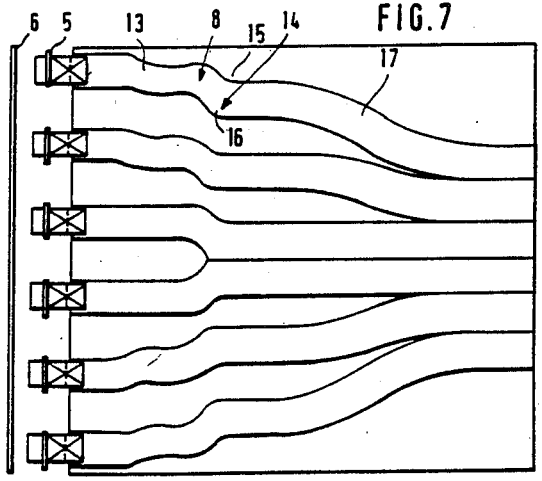
Figure 8:
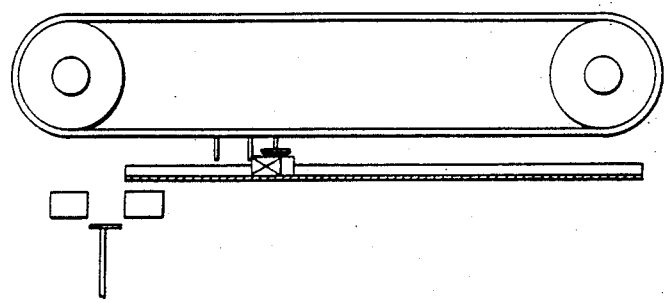
FIGS. 8 and 9 illustrate again, respectively in side elevation and plan view, in the arrangement of FIGS. 1 and 2 the point at which the articles, respectively packages, are turned along their feed path; .
Figure 9:
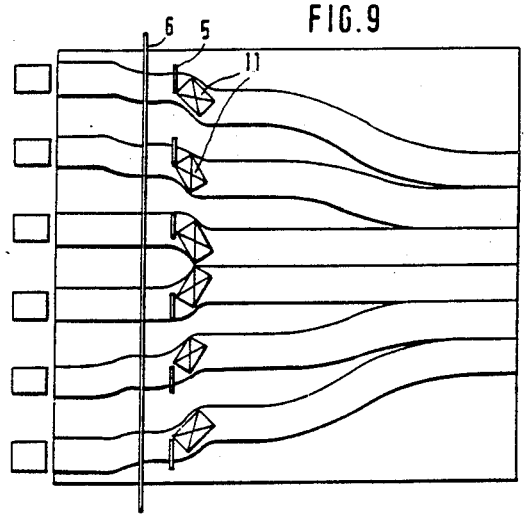
Figure 10:
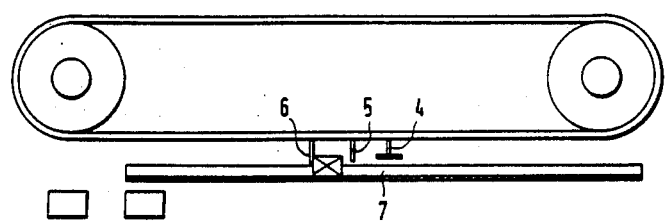
FIGS. 10 and 11 illustrate again in the arrangement of FIGS. 1 and 2, respectively in side elevation and plan view, the orienting and collecting of the articles and packages.
Figure 11:
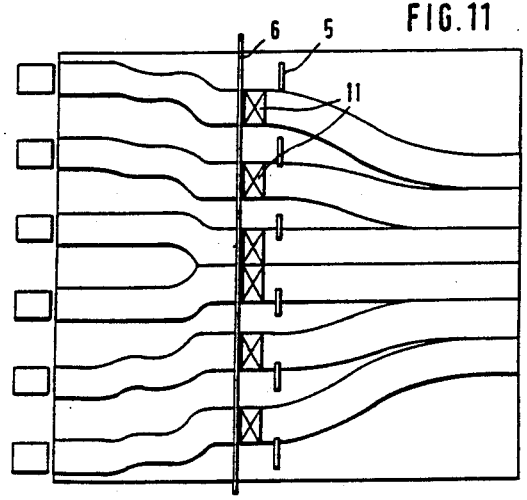

There is illustrated in FIG. 1 a transport arrangement 1 in the form of an endless belt, e.g., a toothed belt 2 or a chain or the like. There are mounted on the toothed belt 2 groups of sliders 3. These groups of sliders 3 act on the packages in the transport or feed direction of the toothed belt 2. Each group of sliders 3 includes an impacting member 4, an entrainer segment 5 and a transversely extending strip 6. Underneath the transport arrangement 1 there is mounted a feed member 7 which includes guide-path means. The means include six juxtaposed curved paths, respectively curved guide grooves 8 (see FIG. 2). There is mounted underneath the feed member 7 a cell 9 of a nonillustrated packaging machine. A package 11 is lifted by means of a lift arrangement 12 up the level of the feed member 7. In accordance with the number of the feed paths 8, a corresponding number of cells 9 and lifters 12 are arranged, so that, as can be seen from FIG. 2, there is provided for each guide groove 8 a package 11. The transport (lifting) operation of the cells is effected stepwise with 180° feed operation and 180° inactivity. The lifting of the packages 11 places them in an inoperative position. The impacting member 4, which is mounted on the toothed belt 2, serves during lifting of the package as a stop, as is illustrated in FIG. 4. As is illustrated in FIGS. 6 and 7, the packages 11 are, with the aid of the entrainer segments 5, are slid in by the continuously running toothed belt 2 from the lifter 11 into the inlet region of the curve grooves 8. With the aid of the entrainer segments 5, the packages 11, as is illustrated in FIGS. 8 and 9, are thus slid in the region of a grooved curve. By means of the turning flanks 14, which have a point-like projection 15 and a corresponding recess 16 (see FIG. 14), the packages 11 are turned by 90° as a result of the special arrangement of the flanks 14 and projections 15.

Figure 12:
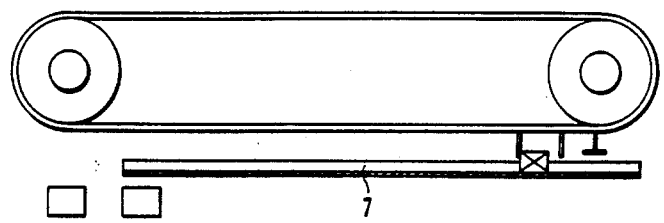
FIGS. 12 and 13 illustrate again, respectively in side elevation and plan view, the end position of the collected packages in the arrangement of FIGS. 1 and 2.
Figure 13:
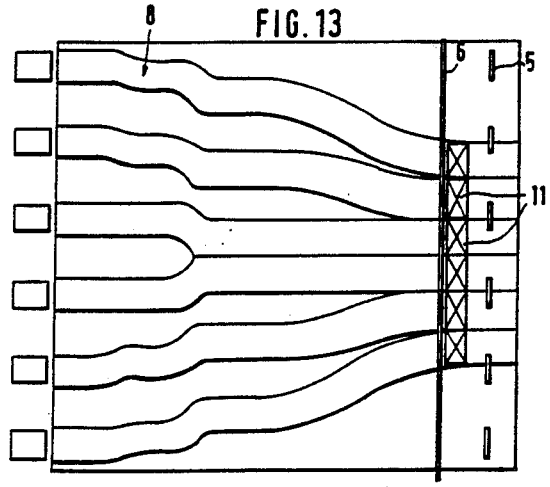

After such turning, the entrainer segments 5, which move straight forward, leave the path of the curve grooves 8, so that the packages 11 can now be seized by the following common transverse entrainer strip 6 and thereby are fully oriented and are further transported into the feed region 17 of the curved grooves (FIG. 7) up to the end of the feed path, so that finally the packages assume the position illustrated in FIG. 12 and 13. In this position, the packages have the desired distance relative to each other and can therefore be slid from the feed outlet region onto another non-illustrated transport system.

Figure 14:
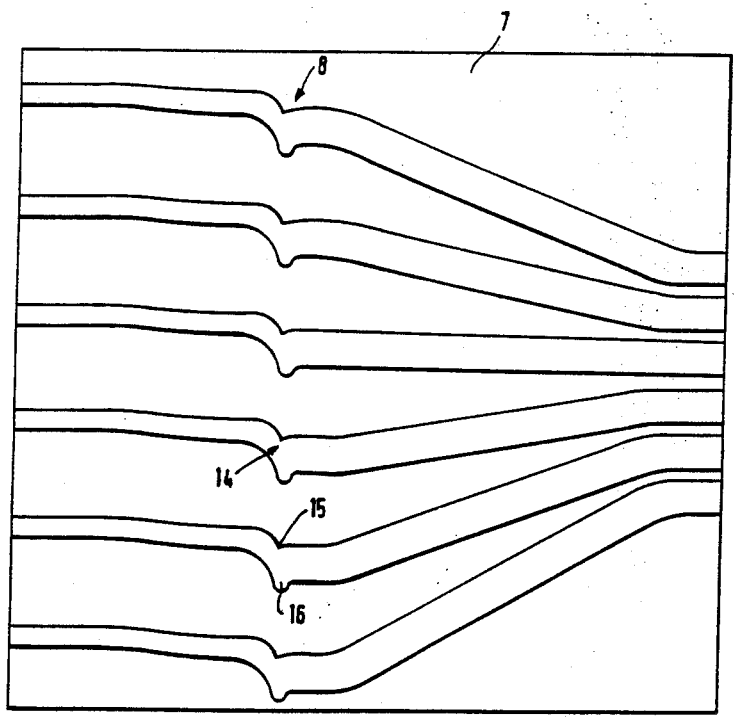
FIG. 14 illustrates in an enlarged scale an alternate embodiment of the guide path arrangement for turning the packages in the same direction.

In the aforedescribed embodiment there is illustrated in FIG. 1—13, e.g., a six paths packaging machine in which at all times three paths 8 are arranged on one side and three paths 8 on the other side of a central axis. In this arrangement the packages 1 of each group of paths 8 are turned in opposite direction with respect to the packages 11 in the other group. It is, of course, understood that if so desired it is also possible to turn all packages in the same direction. For this purpose an arrangement is provided as illustrated in FIG. 14, in which, therefore the pointed projections 15 and the recesses 16 all are oriented in t he same direction. It is, of course, understood that the corresponding inlet region must be slightly larger than the width of the package, whereas the corresponding outlet region is also somewhat larger than the length of the slidably fed package.

There is illustrated in FIGS. 15 to 17 a further alternate embodiment, in which the feed-sliding, turning and collecting of the packages 11 is achieved in such a way that the packages 11, which have been moved upwardly by the lifter 12 to the level of the feed members 7, are immediately turned by the slider. In this embodiment the slider is constructed as a slide member 21 which guidingly and slidingly moves between the side walls 18, 19, whereby, in particular when the upper surface of the member 7 is somewhat rough, the packages roll along two curved flanks 22, 23 and finally impinge on a holding surface 24 of the slide member 21, which extends transversely and normally to the slide feed movement.

Thereby the packages 11 ar uniformly guided between the hold surface 24 and a corner formed therewith by the respective curved flanks 22, 23, so that the packages in the further transport movement of the slide member 21 are precisely centered between two glide grooves 25, 26 into which they are slid, and from which the packages 11 can be fed to another transport system in a nonillustrated manner. An intermediate position of the slide member 21 is illustrated in dot-dash lines, whereas the end position of the slide member is again illustrated in full lines.

In order to ensure the rotation of the packages 11 in each case, there can be provided on the outer side of the slider 7 a further flank 27, onto which the package 11, during the forward movement of the slide member 21, impinges and thereby supports the rotation of the package 11. In lieu of a flank 7 one can also use an air jet mechanism 28, whose air jet impinges on the forward edge of the package 11, whereby the same effect is achieved.

For a flaw-free rotation of the package 11 additional support means are finally still further provided, e.g., when the free edge 29 of the turning flank, e.g., the edge 23 engages behind the package 11, as is illustrated in FIG. 17.

It is understood that the invention is not limited to the illustrated embodiments but can, in the spirit of the claims, specification and drawings, be further modified, e.g., there can, from the upper side, engage a brake onto the packages whereby the turning effect can also be controlably carried out. There can be provided in a corresponding construction for the slider whereby it has a slider edge 24 that is normal to the feed motion and corresponding flanks which are correspondingly fixed onto the slider whereby the feed movement of the package is effected outwardly rather than inwardly. Similarly, there can, by further modification of the slider 21, be provided a feed movement of the packages without turning motion.

Figure 18:
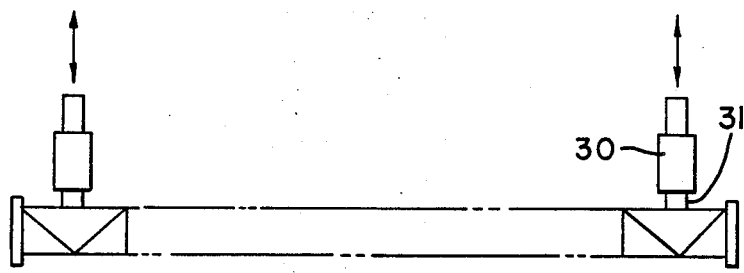
FIG. 18 is a schematic side elevational view of a brake mechanism engaging excentrically the upper surface of a pair of packages.

Such a brake mechanism 30 is schematically illustrated in FIG. 18. A plunger 31 can be selectively lowered by the brake mechanism 30 to excentrically engage the upper surface of a package 11 and thereby aid in the turning movement of the package 11.

Figure 19:
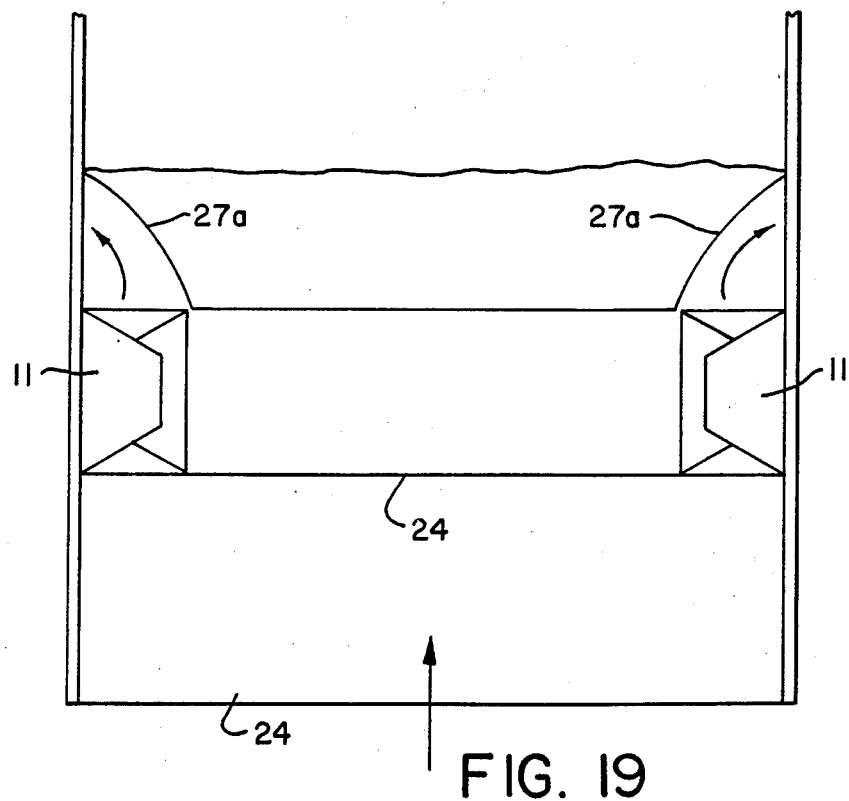
FIG. 19 is a plan schematic view of an alternate construction of the transport arrangement.

A further feature of the invention described hereinabove is illustrated in FIG. 19 where a pair of fixed flanks having a corresponding pair of outwardly curved flank surfaces 27a is illustrated. The fixed flanks are mounted at opposite sides of the entrainers 24, separate therefrom. This feature can be used in conjunction with the brake mechanism 30.

While there have been disclosed several embodiments of the present invention, it is to be understood that these embodiments are given by example only and not in a limiting sense.

We claim:

1. An improved arrangement for turning each of a series rectangular box-shaped articles during their transportation in a feed direction along a substantially horizontal feed path means which is laterally limited by curved guide means, including endless, drivable push means coacting with each one of said series of rectangular box-shaped articles, said push means include sliders which first engage excentrically each box-shaped article for turning it and then engage it centrally or symmetrically, the improvement comprising in combination,
   said feed path means includes a plurality of contiguous paths, each one of which has an outlet end,
   said contiguous paths converge toward each other near their outlet ends,
   said sliders include first and second slide means,
   said first slide means consist of a plurality of elements which are mounted in a row and spaced at a predetermined distance adjacent to each other, said distance is selected in such a way as to permit the passage of a rectangular box-shaped article between adjacent elements,
   said second slider means consist of a single transverse slider which extends transversely across all contiguous paths,
   said curved guide means is constructed in such a way that during a forward slide movement of said rectangular box-shaped articles along said contiguous paths said rectangular box-shaped articles are moved laterally, whereby the first slide means engage said rectangular box-shaped articles excentrically so that said articles are slidably turned into an intermediate position by engagement with said curved guide means and thereafter they are engaged by said single transverse slider and said articles are further turned and moved in said feed direction towards the outlet ends of said contiguous paths.

2. The arrangement for transporting rectangular box-shaped articles, in particular packages, as set forth in claim 1, wherein said curved guide means is also constructed to effect turning.

3. The arrangement for transporting rectangular box-shaped articles, in particular packages, as set forth in claim 1, wherein said curved guide means include at least one inner curved guide path and at least a pair of outer curved guide paths bilaterally disposed relative to said inner guide path, at least a portion of said inner and outer curved guide paths extending angularly with respect to the feed direction of said packages.

4. The arrangement for transporting rectangular box-shaped articles, in particular packages, as set forth in claim 3, wherein said push means includes a driven endless belt.

5. The arrangement for transporting rectangular box-shaped articles, in particular packages, as set forth in claim 3, wherein said push means includes an endless chain drive.

6. The arrangement for transporting rectangular box-shaped articles, in particular packages, as set forth in claim 1, wherein said sliders extend normally from said transport means, the free end of each of the first slide means forming a rounded off edge.

7. The arrangement for transporting rectangular box-shaped articles, in particular packages, as set forth in claim 6, wherein said first and second slide means form a plurality of groups of entraining members, each group of entraining members also includes an impact receiving member which is operatively mounted on said transport means.

8. The arrangement for transporting rectangular box-shaped articles, in particular packages, as set forth in claim 7, wherein said curved guide means includes a feed table in which a plurality of guide grooves are disposed, each one of said guide grooves has a curved flank portion which defines an inlet region, the width of each one of said inlet regions of each guide groove has a width relative to the feed direction, which is slightly larger than the width of the packages being fed therealong, each one of said guide grooves also having an outlet region disposed immediately downstream from said curved flank portion, each one of said outlet regions being slightly longer than the length of the package passing therethrough.

9. The arrangement for transporting rectangular box-shaped articles, in particular packages, as set forth in claim 1, wherein said curved guide means include a feed table and a plurality of curved guide paths which are mirror-like symmetrically arranged about a central axis extending along the feed direction of said curved guide means.

10. The arrangement for transporting rectangular box-shaped articles, in particular packages, as set forth in claim 8, wherein said curved flank portions are all inclined in the same direction relative to the feed direction.

11. The arrangement for transporting rectangular box-shaped articles, in particular packages, as set forth in claim 8, wherein each one of said curved flank portions includes a portion inwardly projecting into said curved guide path and a recess in said guide path opposite said inwardly projecting portion.

12. The arrangement for transporting rectangular box-shaped articles, in particular packages, as set forth in claim 1, wherein said sliders include an entraining member having a flat feed edge which extends transversely to the feed direction and a non-movable flank member coacting with said entraining member so as to turn an article being transported thereby.

* * * * *